United States Patent [19]

Furukawa et al.

[11] 4,009,132
[45] Feb. 22, 1977

[54] SIZING AGENT FOR GLASS FIBERS

[75] Inventors: Jun-ichi Furukawa; Yoshinao Kono, both of Wakayama; Kahei Sakaguchi, Ichikawa, all of Japan

[73] Assignee: Kao Soap Co., Ltd., Tokyo, Japan

[22] Filed: Dec. 23, 1975

[21] Appl. No.: 643,690

[30] Foreign Application Priority Data

Dec. 24, 1974 Japan .............................. 49-1558

[52] U.S. Cl. ................. 260/29.2 UA; 260/29.2 E; 260/29.2 EP; 260/22 R; 260/29.6 MN; 260/29.6 N; 260/29.6 PM; 427/390 A; 427/390 B

[51] Int. Cl.² ................. C08L 67/08; C08L 67/06

[58] Field of Search ............ 260/29.2 UA, 29.2 E, 260/29.2 EP, 22 R, 22 EP, 29.6 N, 29.6 MN, 29.6 PM; 427/390 A, 390 B

[56] References Cited

UNITED STATES PATENTS

| | | | |
|---|---|---|---|
| 2,801,189 | 7/1957 | Collier | 428/361 |
| 2,855,373 | 10/1958 | Guenther | 260/842 |
| 3,063,870 | 11/1962 | Wakeman | 260/29.2 UA |
| 3,097,963 | 7/1963 | Caroselli | 260/22 R |
| 3,214,491 | 10/1965 | Stanton | 260/871 |
| 3,345,339 | 10/1967 | Parker | 260/75 |
| 3,442,842 | 5/1969 | von Bonin | 260/29.2 |
| 3,923,708 | 12/1975 | Furukawa et al. | 260/22 R |

Primary Examiner—Murray Tillman
Assistant Examiner—T. De Benedictis, Sr.
Attorney, Agent, or Firm—Woodhams, Blanchard and Flynn

[57] ABSTRACT

A sizing agent for glass fibers comprises a lubricant for glass fibers, a coupling agent, an antistatic agent and a film-forming substance composed of an oil-in-water type emulsion of an unsaturated polyester obtained by reacting a dibasic acid, an adduct of bisphenol A and alkylene oxide, an adduct of caster oil and an alkylene oxide or polyethylene glycol and an amino-glycol or its derivative.

9 Claims, No Drawings

SIZING AGENT FOR GLASS FIBERS

BACKGROUND OF INVENTION

2. Field of Invention

This invention relates to a sizing agent for materials composed of glass, such as glass fibers. More particularly, the sizing agent provided by the present invention is characterized in that a bisphenol type self-emulsifiable polyester modified with an amino glycol is used as a film-forming substance. When the sizing agent of the present invention is employed, undesired green or greenish brown discoloration in the appearance of a glass fiber-reinforced article can be effectively prevented.

2. Description of Invention

For curing of unsaturated polyester resin, there are generally employed a hydroperoxide, an acyl peroxide, a ketone peroxide or the like as a catalyst and a cobalt salt as a curing accelerator, and this curing technique is applied to production of glass fiber-reinforced articles (FRP). However, when an unsaturated polyester is cured according to such curing method, in the resulting reinforced article an undesired green or greenish brown discoloration is often observed to degrade the appearance characteristics. Since these glass fiber reinforced plastics are recently applied vigorously to production of furnitures, decorative laminates and the like, this green or greenish brown discoloration is now more undesired. Especially when a bisphenol type unsaturated polyester is used as a matrix resin, since a tertiary amine is used as a curing accelerator, discoloration is readily caused in the cured product even by slight changes in curing conditions. This undesired phenomenon of discoloration is caused by complicated influences of the exothermic temperature at the curing step, the cobalt content, the ambient temperature at the molding step, the kind and amount of the glass fiber-treating agent and other factors, and it is very difficult to elucidate causes of the discoloration.

SUMMARY OF INVENTION

As a result of our research works made with a view to overcoming this defect involved in the conventional technique, the present inventors found that when an amino glycol-modified, bisphenol type, self-emulsifiable unsaturated polyester is used as the film-forming substance, resulting fiber reinforced plastics (FRP) comprising as a substrate glass fibers treated with this sizing agent are free of green or greenish brown discoloration but have a pink or brown appearance and are excellent in transparency and water resistance. Based on this finding, we have now completed this invention. It is therefore a primary object of the present invention to provide a novel sizing agent for glass fibers which can provide FRP articles having such excellent properties.

More specifically, in accordance with the present invention, there is provided a sizing agent for glass fibers comprising a film-forming substance, a lubricant for glass fibers, a coupling agent and an antistatic agent, said sizing agent being characterized in that an oil-in-water type emulsion of an unsaturated polyester is used as the film-forming substance, said oil-in-water type emulsion being prepared by reacting under heating (a) 1 mole of a dibasic acid component containing at least 50 mole % of fumaric acid or maleic anhydride, (b) 1 to 1.5 moles of a diol component containing at least 30 mole % of an adduct of 2 to 10 moles of an alkylene oxide to bisphenol A, (c) 5 to 30 parts by weight, per 100 parts by weight of said polyester-forming raw materials (a) and (b), of an emulsifier selected from the group consisting of an adduct of 5 to 200 moles of an alkylene oxide to castor oil, an adduct of 5 to 200 moles of an alkylene oxide to hardened castor oil and a polyethylene glycol having an average molecular weight of 1,000 to 6,000 and (d) 0.1 to 3.0 parts by weight, per 100 parts by weight of the sum of the raw materials (a), (b) and (c), of a compound represented by the following general formula:

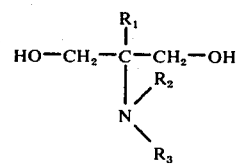

wherein $R_1$, $R_2$ and $R_3$ each stand for a hydrogen atom or an alkyl group having 1 to 4 carbon atoms, and mixing the resulting unsaturated polyester with water.

Preparation of an oil-in-water type emulsion of an unsaturated polyester to be used as the film-forming substance in the present invention will now be described.

In the first place, reactants are heated according to a customary method of polycondensation while removing water formed by the reaction, and an unsaturated polyester is thus formed. This polycondensation reaction is carried out at a temperature of 150° to 210° C., preferably 170° to 200° C. The reaction is terminated when the acid value is lowered to 30 or lower. An amino glycol component represented by the above general formula may be added at the start of the reaction, but since the resulting unsaturated polyester per se is often colored in such case, it is preferred that the amino glycol be added at the initial stage of the reaction (at the stage where the acid value is 35 to 60). Then, the resulting polyester is cooled to 100° to 150° C. and it is gradually added under sufficient agitation to water maintained at 60° to 95° C., whereby an oil-in-water type emulsion in which the unsaturated polyester is completely emulsified.

In preparing the bisphenol type self-emulsifiable unsaturated polyester to be used in the present invention, by changing optionally the proportion of the alkylene oxide adduct of bisphenol A in the diol component, it is made possible to obtain a variety of unsaturated polyesters ranging from a highly viscous liquid to a solid having a softening point of up to 95° C.

Fumaric acid or maleic acid should indispensably be used as the acid component for preparation of the unsaturated polyester. It is necessary that fumaric acid or maleic anhydride should occupy at least 50 mole % of the total acid component. Other $\alpha,\beta$-unsaturated basic acids such as maleic acid and itaconic acid may be used in amounts of up to 50 mole % of the total acid component. From the industrial viewpoint, it is preferred to use fumaric acid or maleic anhydride alone as the acid component.

A small amount of a saturated basic acid such as tetrahydrophthalic anhydride, phthalic anhydride, isophthalic acid, adipic acid, succinic acid or the like can be used in combination with fumaric acid or maleic anhydride according to need.

An alkylene oxide adduct of bisphenol A should indispensably be used as the diol component. As the adduct, there is employed one formed by adding 2 to 10 moles of an alkylene oxide to 1 mole of 2,2-bis(4-hydroxyphenylpropane) which is generally called bisphenol A. As the alkylene oxide, there can be mentioned, for example, ethylene oxide and propylene oxide. It is preferred that the alkylene oxide to bisphenol A be used in an amount of at least 30 mole % of the total diol component.

A part of the alkylene oxide adduct of bisphenol A may be substituted by hydrogenated bisphenol A. Further, it is possible to use, in combination with the alkylene oxide adduct of bisphenol A, a diol represented by the following general formula:

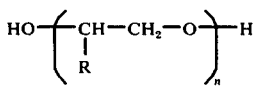

wherein $n$ is an integer of from 1 to 4 and R stands for H or $CH_3$.

Namely, a diol represented by the above general formula may be used in combination with the alkylene oxide adduct of bisphenol A as well as hydrogenated bisphenol A. As specific examples of such diol, there can be mentioned ethylene glycol, propylene glycol, diethylene glycol, triethylene glycol, tetraethylene glycol, dipropylene glycol, tripropylene glycol and tetrapropylene glycol.

As an alkylene oxide adduct of castor oil or hardened castor oil to be used for preparation of the self-emulsifiable polyester, there can be mentioned adducts formed by adding 5 to 200 moles, preferably 50 to 150 moles, of an alkylene oxide to castor oil or hardened castor oil. Ethylene oxide is generally used as the alkylene oxide. A polyethylene glycol having an average molecular weight of 1,000 to 6,000 can be used instead of the alkylene oxide of castor oil or hardened castor oil.

In the present invention, the unsaturated polyester is prepared by reacting 1 to 1.5 moles of the diol component with 1 mole of the acid component. It is preferred that as the emulsifier for preparation of the unsaturated polyester [namely, the component (c)], the alkylene oxide adduct of castor oil or hardened castor oil or the polyethylene glycol be used in an amount of 5 to 30 parts by weight per 100 parts by weight of the sum of the acid component [the component (a)] and the diol component containing at least 30 mole % of the adduct of 2 to 10 moles of an alkylene oxide to bisphenol A [the component (b)]. Minute amounts of a polymerization inhibitor, a defoaming agent and other additive used in this field may be added to the reaction mixture according to need.

As specific examples of the amino glycol of the following general formula:

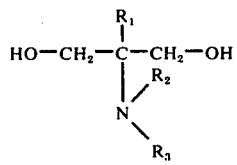

wherein $R_1$, $R_2$ and $R_3$ each stand for a hydrogen atom or an alkyl group having 1 to 4 carbon atoms, that is used as the raw material of the polyester resin in the present invention, there can be mentioned 2-amino-2-methyl-1,3-propane diol, 2-amino-2-ethyl-1,3-propane diol, 2-dimethylamino-2-methyl-1,3-propane diol, 2-diethylamino-2-methyl-1,3-propane diol, 2-dimethylamino-2-ethyl-1,3-propane diol, 2-methylethylamino-2-ethyl-1,3-propane diol, 2-dipropylamino-2-methyl-1,3-propane diol, 2-dipropylamino-2-ethyl-1,3-propane diol, 2-dibutylamino-2-methyl-1,3-propane diol, 2-butylamino-2-ethyl-1,3-propane diol, 2-amino-2-propyl-1,3-propane diol and 2-amino-2-butyl-1,3-propane diol. These amino glycols are very effective for improving the discoloration characteristic of FRP. If such amino glycol is reacted with other reactants according to a method as disclosed in the present invention, it is combined and introduced into a part of the molecular chain of the polyester.

The so prepared polyester is mixed with water to form an oil-in-water type emulsion. Molded articles of glass fibers treated with this polyester emulsions have a good water resistance. In contrast, in case the amino glycol is not made to participate in the polyester-forming reaction but it is added to a polyester formed by reaction among the components (a), (b) and (c), molded articles of glass fibers treated with the so formed sizing agent have a pink or brown color but their water resistance is poor. For example, when they are immersed in boiling water and the boiling treatment is conducted for a short time, patterns of glass fibers are manifested on the surfaces of the molded articles. This phenomenon is not preferred from the practical viewpoint.

The amino glycol-modified, bisphenol type self-emulsifiable polyester of the present invention is very valuable as a film-forming substance of a sizing agent for glass fibers, and it is practically applied after it has been combined with a lubricant, a coupling agent and an antistatic agent.

Known lubricants can be used effectively. For example, there can be employed oils, fats and waxes of animals and marine products such as carnauba oil and candelilla wax, silicone oils such as dihydrocarbonpolysiloxane, glycerin, polyethylene glycol, polyhydric alcohol esters such as esters of diethylene glycol and tetraethylene glycol, fatty alcohols such as lauryl alcohol and stearyl alcohol, pelargone amide, and fatty acid amines such as polybasic unsaturated fatty acid amide solubilized by an anhydrous acid.

Coupling agents known in the art are effectively used. For example, there can be mentioned silanes such as vinyl triethoxysilane, vinyl triacetoxysilane, allyl trichlorosilane, aminosilane, epoxysilane and γ-methacryloxypropyl trimethoxysilane, and siloxanes such as vinyl trisiloxane and allyl polysiloxane.

The valuable antistatic agents include sulfonates and sulfates of triethanol amine represented by the formula $ASO_3H \cdot N(CH_2CH_2OH)_3$ or $AOSO_3H \cdot N(CH_2CH_2OH)_3$ in which A stands for an alkyl group having 8 to 20 carbon atoms, an alkylbenzene residue

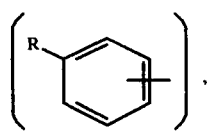

an alkylnaphthalene residue

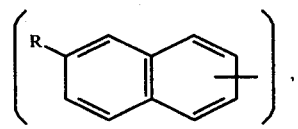

a polyoxyethylene alkyl ether [R.O(CH$_2$CH$_2$O)$_{\overline{n}}$ in which $n$ is a number of 1 to 200], a polyoxyethylene alkylphenyl ether residue

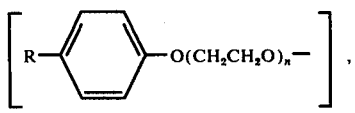

a naphthalene-formaline condensate residue

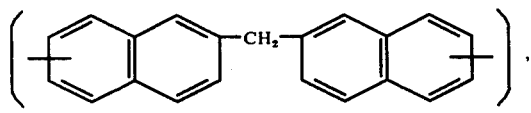

a dialkylsuccinic acid residue

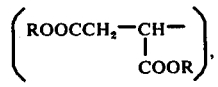

and an alkyl diphenyl oxide

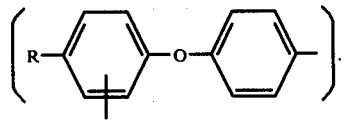

Further, triethanol amine salts of oxyacids of metals selected from titanium, antimony, molybdenum, vanadium, aluminum, zinc, tin, germanium, zirconium, tungsten, boron and tellurium are effectively used as the antistatic agent.

The amount of the lubricant incorporated in the sizing agent for glass fibers according to the present invention is 10 to 30 parts by weight per 100 parts by weight of the film-forming substance, the amount of the coupling agent is 5 to 50 parts by weight per 100 parts by weight of the film-forming substance, and the amount of the antistatic agent is 1 to 10 parts by weight per 100 parts by weight of the film-forming substance.

The amount of the sizing agent composition to be applied onto glass fibers is preferably 0.5 to 2.0% by weight as calculated as solids.

EXAMPLE 1

A reaction vessel equipped with a stirrer, a thermometer, a nitrogen introducing pipe and a dehydrating pipe was charged with 1050 g (3.0 moles) of 2.0 Prodendro-Bisphenol (adduct of 2.0 moles of propylene oxide to bisphenol A), 323 g (2.8 moles) of fumaric acid, 343 g of Polyethylene Glycol No. 1540 (having an average molecular weight of 1500), 1.0 g of hydroquinone and 0.3 g of a silicone as a defoaming agent (sold under the tradename of Toshiba Silicone TSA-730), and the mixture was heated and reacted at 160° to 210° C. in a nitrogen gas current. When the acid value of the formed unsaturated polyester was 40, 17.2 g of 2-2mino-2-methyl-1,3-propane diol was added to the reaction mixture and the reaction was further conducted.

When the acid value was reduced to 20, the reaction was terminated, and the reaction product was cooled to 120° C. and was gradually added under sufficient agitation to water maintained at 60° to 70° C. to form a homogeneous emulsion. The concentration of the unsaturated polyester in the resulting oil-in-water emulsion was adjusted to 30% by weight.

A glass fiber cloth was immersed in a sizing composition comprising 3% by weight of the polyester emulsion, 0.18% by weight of γ-methacryloxypropyl trimethoxysilane (coupling agent), 0.08% by weight of Fatty Acid Amide-Silasol 185A (lubricant), 0.10% by weight of triethanol amine lauryl sulfate (antistatic agent) and 0.04% by weight of acetic acid with the balance being water, and the cloth was air-dried and heated at 120° C. for 2 hours to age the sizing agent. Prior to this sizing treatment, paste on the cloth was burnt away, and the cloth was washed cleanly and cut into a size of 20 × 20 cm. The amount of the sizing composition applied onto glass fibers of the cloth was 0.8% as calculated as solids. By using the so treated cloth, a five-layer laminate of a glass fiber cloth-reinforced polyester resin (having a glass content of 25 to 30%) was prepared. The resin used was ATLAC 382-05 manufactured by Kao-Atlas Co. (bisphenol type polyester resin). Dimethyl aniline, cobalt naphthenate and methylethylketone peroxide were used as a curing agent and a curing accelerator. The curing was conducted at room temperature for 20 to 30 minutes.

In order not to make evaluation based on eventually obtained results, 4 lots of ATLAC 382-05 resin were chosen and laminates were prepared in the same manner by using these lots. All the laminates had a preferred brown color without green discoloration. Namely, the following results were obtained:

| | Lot No. of ATLAC 382-05 | | | |
|---|---|---|---|---|
| | 1 | 2 | 3 | 4 |
| Curing Conditions | | | | |
| dimethyl aniline | 0.1 | 0.1 | 0.1 | 0.1 |
| cobalt naphthenate | 0.4 | 0.5 | 0.4 | 0.6 |
| methylethylketone peroxide | 0.8 | 0.7 | 0.7 | 0.8 |
| Color of Laminate | brown | brown | brown | brown |

In the above Table, each number denotes the amount (part by weight per 100 parts by weight) of ATLAC 382-05.

When laminates were prepared by using EPOLAC N-350L (iso-type) instead of ATLAC 382-05 (promotor: cobalt naphthenate, catalyst: methylethylketone peroxide), each laminate had a good pink color and was excellent in the transparency.

EXAMPLE 2

The same reaction vessel as used in Example 1 was charged with 1037 g (3.2 moles) of an adduct of 2 moles of ethylene oxide to bisphenol A, 294 g (3.0 moles) of maleic anhydride, 330 g of an adduct of 100 moles of ethylene oxide to castor oil, 1.0 g of hydroquinone and 0.3 g of a silicone as a defoaming agent (sold under the tradename of "Toshiba Silicone" TSA-730), and the mixture was heated and reacted at 160° to 210° C. in a nitrogen gas current. When the acid value of the formed unsaturated polyester was 45, 24.9 g of 2-dimethylamino-2-ethyl-1,3-propane diol was added to the reaction mixture, and the reaction was further conducted. When the acid value was lowered to 25, the reaction was terminated, and the reaction product was cooled to 120° C. and was gradually added under sufficient agitation to water maintained at 70° to 80° C. to form a homogeneous emulsion. In the same manner and under the same conditions as described in Example 1, a glass cloth was treated with a sizing composition comprising 3.0% by weight of the so formed emulsion, 0.2% by weight of γ-methyacryloxypropyl trimethoxysilane (coupling agent), 0.08% by weight of Fatty Acid Amide-Silasol 220 (lubricant), 0.12% by weight of triethanol amine lauryl naphthalenesulfonate (antistatic agent) and 0.04% by weight of formic acid with the balance being water, and dried and used for formation of laminates of ATLAC 382-05 resin. Each of laminated structures had a preferred transparent brown color regardless of the lot difference or the curing conditions. When EPOLAC N-350L was laminated by using the so treated glass cloth, the laminated structures had a preferred transparent pink color.

EXAMPLE 3

The same reaction vessel as used in Example 1 was charged with 566.9 g (1.6 moles) of an adduct of 2 moles of propylene oxide to bisphenol A, 580 g (0.8 mole) of hydrogenated bisphenol A, 448 g (4.2 moles) of fumaric acid, 340 g of polyethylene glycol having an average molecular weight of 4,000 and 0.5 g of a silicone (sold under the tradename of Toshiba Silicone TSA-750), and the mixture was heated and reacted at 160° to 210° C. in a nitrogen gas current. When the acid value of the formed polyester was 40, 40.0 g of 2-dipropylamino-2-ethyl-1,3-propane diol was added to the reaction mixture, and the reaction was further conducted. When the reaction was continued for about 10 hours, there was obtained a reaction product having an acid value of 25 and a softening point of 90° C. Then, the reaction product was cooled to 140° C. and gradually added under agitation to hot water maintained at 90° to 95° C. to form a homogeneous unsaturated polyester emulsion. In the same manner and under the same conditions as described in Example 1, a glass cloth was treated with a sizing composition comprising 3.0% by weight of the polyester emulsion, 0.2% by weight of γ-methacryloxypropyl trimethoxysilane, 0.08% by weight of Fatty Acid Amide-Silasol GY, 0.12% by weight of triethanol amine titanate and 0.05% by weight of formic acid with the balance being formic acid, and dried and used for formation of laminated structures of ATLAC 382-05. Each laminate had a preferred transparent brown color regardless of the lot difference and the curing conditions. When EPOLAC N3502 was laminated by using the so treated glass cloth, the laminate structure had a preferred transparent pink color.

EXAMPLE 4

The same reaction vessel as used in Example 1 was charged with 1128 g (3.2 moles) of an adduct of 2 moles of propylene oxide to bisphenol A, 76.1 g (1.0 mole) of propylene glycol, 314 g (3.2 moles) of maleic anhydride, 120 g (0.8 mole) of phthalic anhydride, 430 g of an adduct of 100 moles of ethylene oxide to hardened castor oil, 1.6 g of hydroquinone and 0.7 g of a silicone, and the mixture was heated and reacted at 160° to 210° C. in a nitrogen gas current. When the acid value was 50, 31.1 g of 2-amino-2-propyl-1,3-propane diol was added to the reaction mixture, and the reaction was further conducted. When the reaction was continued for about 11 hours, there was obtained a reaction product having an acid value of 22. The reaction product was cooled and gradually added under agitation to water maintained at 70° to 80° C. to form a homogeneous unsaturated polyester emulsion. In the same manner and under the same conditions as described in Example 1, a glass cloth was treated with a sizing composition comprising 3.0% by weight of the so formed emulsion, 0.2% by weight of γ-methacryloxypropyl trimethoxysilane, 0.08% by weight of Fatty Acid Amide-Silasol FG, 0.12% by weight of a triethanol amine salt of a naphthalenesulfonic acid-formalin condensate and 0.05% by weight of hydrochloric acid with the balance being water, and dried and used for formation of laminated structures of ATLAC 382-05 resin. Each laminate had a preferred brown color regardless of the lot difference and the curing conditions. When EPOLAC N-350L was laminated by using the so treated glass cloth, the laminate had a preferred pink color.

COMPARATIVE EXAMPLE 1

In the same manner as described in Examples 1 to 4, self-emulsifiable unsaturated polyester resins were prepared, except that the reaction was conducted until the same acid values were attained without addition of 2-amino-2-methyl-1,3-propane diol, 2-dimethylamino-2-ethyl-1,3-propane diol, 2-dipropylamino-2-ethyl-1,3-propane diol and 2-amino-2-propyl-1,3-propane diol. In the same manner as described in the foregoing Examples, respective polyester resins were compounded with the coupling agent, the lubricant and the antistatic agent. Glass clothes were treated with the so prepared sizing compositions, dried and used for formation of laminated structures of ATLAC 382-05 and EPOLAC N-350L. Each of the resulting laminated structures had a greenish brown color regardless of the lot difference and the curing conditions in the case of ATLAC 382-05. In the case of EPOLAC N-350L, each laminate structure had a green color and the appearance characteristic was not preferred.

COMPARATIVE EXAMPLE 2

The amino glycol-free emulsions prepared in Comparative Example 1 were mixed with 2-amino-2-methyl-1,3-propane diol, 2-dimethylamino-2-ethyl-1,3-propane diol, 2-dipropylamino-2-ethyl-1,3-propane diol and 2-amino-2-propyl-1,3-propane diol, respectively, after preparation of the emulsions. Each mixture was compounded with the coupling agent, the lubricant and the antistatic agent in the same manner as in the foregoing Examples. Glass clothes were treated with the so prepared sizing compositions in the same manner as described in Examples 1 to 4, and dried and used for formation of laminated structures of ATLAC 382-05 and EPOLAC N-350L. In the case of ATLAC 382-05, each laminate had a brown color regardless of the lot difference and the curing conditions as products obtained in Examples 1 to 4, and also in the case of EPOLAC N-350L, each laminate had a preferred pink color.

Laminated products obtained in Examples 1 to 4 and Comparative Example 2 were immersed in boiling water and the water resistance test was conducted for 20 hours. In each of the laminated products obtained in Comparative Example 2, patterns of glass fibers were manifested on the surfaces of the laminated structures. Thus, it was confirmed that laminate structures formed by using an emulsion into which the amino glycol was incorporated after the polyester-forming reaction were inferior in the water resistance.

Results of the water resistance test are shown in the following Table.

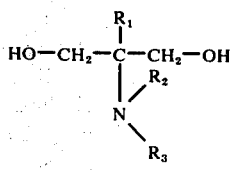

wherein $R_1$, $R_2$ and $R_3$ each stand for a hydrogen atom
or an alkyl group having 1 to 4 carbon atoms, and mixing the resulting unsaturated polyester with water.

2. A sizing agent for glass fibers as claimed in claim 1, in which said dibasic acid component comprises at least 50 mole % of fumaric acid or maleic anhydride and maleic acid or itaconic acid.

3. A sizing agent as claimed in claim 1, in which said alkylene oxide is selected from a group consisting of ethylene oxide and propylene oxide.

4. A sizing agent as claimed in claim 1, in which a portion of said adduct of an alkylene oxide and bisphe- Results of Water Resistance Test

| | ATLAC 382-05 (Lot No. 1) | | EPOLAC N-350L | |
|---|---|---|---|---|
| | Color | Water Resistance | Color | Water Resistance* |
| Example 1 | brown, transparent | no patterns of glass fibers manifested | pink, transparent | 85 |
| Example 2 | '' | '' | '' | 88 |
| Example 3 | '' | '' | '' | 85 |
| Example 4 | '' | '' | '' | 83 |
| Comparative Example 2 | | | | |
| 2-amino-2-methyl-1,3-propane diol | brown, transparent | patterns of glass fibers manifested | pink, transparent | 64 |
| 2-dimethylamino-2-ethyl-1,3-propane diol | '' | '' | '' | 62 |
| 2-dipropylamino-2-ethyl-1,3-propane diol | '' | '' | '' | 67 |
| 2-amino-2-propyl-1,3-propane diol | '' | '' | '' | 59 |

*in the case of EPOLAC N-350L, the water resistance was expressed in terms of the retention ratio of the percent transmission of the laminated structure based on the percent transmission before the boiling water treatment which was designated as 100.

What we claim is:

1. A sizing agent for glass fibers comprising a film-forming substance, a lubricant for glass fibers, a coupling agent and an antistatic agent, said sizing agent being characterized in that an oil-in-water type emulsion of an unsaturated polyester is used as the film-forming substance, said oil-in-water type emulsion being prepared by reacting under heating (a) 1 mole of a dibasic acid component containing at least 50 mole % of fumaric acid of maleic anhydride, (b) 1 to 1.5 moles of a diol component containing at least 30 mole % of an adduct of 2 to 10 moles of an alkylene oxide to bisphenol A, (c) 5 to 30 parts by weight, per 100 parts by weight of said polyester-forming raw materials (a) and (b), of an emulsifier selected from the group consisting of an adduct of 5 to 200 moles of an alkylene oxide to castor oil, an adduct of 5 to 200 moles of an alkylene oxide to hardened castor oil and a polyethylene glycol having an average molecular weight of 1,000 to 6,000 and (d) 0.1 to 3.0 parts by weight, per 100 parts by weight of the sum of the raw materials (a), (b) and (c), of a compound represented by the following general formula:

nol A is replaced by hydrogenated bisphenol A.

5. A sizing agent as claimed in claim 1, in which said diol component comprises at least 30 mole % of an adduct of 2 to 10 moles of an alkylene oxide to bisphenol A and a diol represented by the following general formula:

in which $n$ is an integer of from 1 to 4 and R stands for H or $CH_3$.

6. A sizing agent as claimed in claim 5, in which said diol is selected from a group consisting of ethylene glycol, propylene glycol, diethylene glycol, triethylene glycol, tetraethylene glycol, dipropylene glycol, tripropylene glycol and tetrapropylene glycol.

7. A sizing agent as claimed in claim 1, in which said adduct for the emulsifier (c) is selected from a group consisting of an adduct of 50 to 150 moles of an alkylene oxide to castor oil and an adduct of 50 to 150 moles of an alkylene oxide to hardened castor oil.

8. A sizing agent as claimed in claim 1, in which said compound (d) is selected from a group consisting of 2-amino-2-methyl-1,3-propane diol, 2-amino-2-ethyl-1,3-propane diol, 2-dimethylamino-2-methyl-1,3-propane diol, 2-diethylamino-2-methyl-1,3-propane diol, 2-dimethylamino-2-ethyl-1,3-propane diol, 2-methylethylamino-2-ethyl-1,3-propane diol, 2-dipropylamino-2-methyl-1,3-propane diol, 2-dipropylamino-2-ethyl-1,3-propane diol, 2-dibutylamino-2-methyl-1,3-propane diol, 2-butylamino-2-ethyl-1,3-propane diol, 2-amino-2-propyl-1,3-propane diol and 2-amino-2-butyl-1,3-propane-diol.

9. A sizing agent as claimed in claim 8, in which said oil-in-water type emulsion is prepared by reacting a bibasic acid component (a), a diol component (b) and an emulsifier (c) at a temperature in the range between 150° and 210° C. and then reacting the resulting product with a compound (d) after the resulting product has the acid value of 35 to 60.

* * * * *